US006418329B1

(12) United States Patent
Furuya

(10) Patent No.: US 6,418,329 B1
(45) Date of Patent: Jul. 9, 2002

(54) PORTABLE RADIO INFORMATION TERMINAL, SCREEN DISPLAYING METHOD, RECORDING MEDIUM AND MICROCOMPUTER

(75) Inventor: Mami Furuya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,965

(22) Filed: Dec. 21, 1998

(30) Foreign Application Priority Data

Dec. 22, 1997 (JP) ............................................ 9-352737

(51) Int. Cl.[7] ................................................ H04B 7/00
(52) U.S. Cl. ........................ 455/566; 340/7.6; 340/7.61
(58) Field of Search ................................ 455/566, 412, 455/575, 550, 567, 38.1, 38.2, 38.4; 340/7.61, 7.6, 7.62

(56) References Cited

U.S. PATENT DOCUMENTS 4,392,135 A * 7/1983 Ohyagi .................. 340/825.44
4,713,808 A * 12/1987 Gaskill et al. ................ 370/94
5,182,553 A * 1/1993 Kung .................... 340/825.44
5,258,751 A * 11/1993 Deluca et al. ......... 340/825.44
5,463,368 A * 10/1995 Tsunoda et al. ....... 340/309.15
5,508,688 A * 4/1996 Mochiziuki ............ 340/825.44

* cited by examiner

*Primary Examiner*—Edward F. Urban
*Assistant Examiner*—N Mehrpour
(74) *Attorney, Agent, or Firm*—Jay H. Maioli

(57) ABSTRACT

A portable radio information terminal with a message-notification mode/message-storage mode setting unit, a message-notifying-device-operation control unit and a display-mark turning-on/off unit. The message-notification mode/message-storage mode setting unit sets the portable radio information terminal in a message-notification mode for notifying the user of a message in the event of an incoming information signal conveying the message or in a message-storage mode for halting an operation to notify the user of a message in the event of an incoming information signal conveying the message. The message-notifying-device-operation control unit enables a selected message-notifying device to notify the user of an incoming information signal in the message-notification mode or prevents a selected message-notifying device from notifying the user of an incoming information signal in the message-storage mode. The display-mark turning on/off unit means displays a display mark of a selected message-notifying device on the screen of an image displaying unit in the message-notification mode or halts an operation to display display marks of all message-notifying devices including a selected message-notifying device in the message-storage mode.

7 Claims, 11 Drawing Sheets

PORTABLE RADIO INFORMATION TERMINAL, SCREEN DISPLAYING METHOD, RECORDING MEDIUM AND MICROCOMPUTER

BACKGROUND OF THE INVENTION

In general, the present invention relates to a portable radio information terminal and a message-notifying method adopted in the portable radio information terminal to notify the user of the portable radio information terminal of an incoming signal. More particularly, the present invention relates to a portable radio information terminal for confirming that a radio wave received from a radio base station installed at a remote location is a message signal destined for the portable radio information terminal, for notifying the user of the received message signal in the form of sound, light, mechanical vibration or another form to make the user aware of the arrival of the message signal and for displaying a message conveyed in the signal on an embedded screen display unit. The present invention also relates to a message-notifying method adopted in the portable radio information terminal to notify the user of the portable radio information terminal of an incoming signal. In particular, the present invention relates to a portable radio information terminal for carrying out radio communication of signals such as a pager and a message-notifying method adopted in the portable radio information terminal to notify the user of the portable radio information terminal of an incoming signal.

A portable radio information terminal is a handy and portable apparatus that is capable of functioning as a terminal of a communication network. In recent years, there have been implemented portable radio information terminals with a variety of configurations and functions to meet a rapidly growing demand in a wide range of applications in the field of information communication.

An example of such a portable radio information terminal is a pager which is widely used for carrying out communications of radio signals.

An early pager is a terminal for generating ringing sound of a bell when a calling signal is received from a radio base station. A radio calling signal is capable of calling the user carrying this pager even if the user is present at a place far away from a wire telephone set. The radio calling signal is normally used to urge the user to respond to the calling signal by using a wire telephone closest to the user.

By the way, a signal generated by the radio base station is not merely ended with such a calling signal. A signal generated by the radio base station is also capable of conveying information. On the pager side, on the other hand, information conveyed by an incoming signal is decoded and displayed a result of the decoding on a Liquid crystal display panel as a message. A pager having functions to notify the user of an incoming call, decode information conveyed by the incoming-call signal and display such information on a Liquid crystal display panel has been developed and widely used at the present time.

In recent years, such a pager is further provided with more functions such as a function to generate ringing sound of a bell to notify the user of an incoming message so that the user will not miss an incoming call when the pager is used outdoors or at a trip destination or, in particular, in a noisy environment. At a place such as a movie theater or a lecture meeting place, on the other hand, there is not much noise. At such a place, message sound or calling sound will adversely be a disturbance to the atmosphere. In order to solve the problems described above, the pager is provided with a message-notifying means including a vibration function of a vibrator for informing the user of a message by vibration in place of ringing sound of a bell. The pager is designed into a configuration that allows the user to manually operate an input device to select either ringing sound of a bell or vibration of a vibrator as a message-notifying means.

By the way, the portable radio information terminal with the configuration described above is also provided with a function to switch the portable radio information terminal to a message-storage mode in order to prevent message sound such as ringing sound of a bell from being generated in the event of a call arriving at inconvenient times such as a late night and an early morning or during a sleeping period of time.

That is to say, the portable radio information terminal has a message-notification mode and the message-storage mode which can be switched from one to another as the user likes. In the message-notification mode, message sound such as ringing sound of a bell is generated in the event of an incoming call to notify the user of the incoming call and information on the received message is displayed on a screen. In the message-storage mode, on the other hand, no message sound such as ringing sound of a bell is generated in the event of an incoming call in order to suppress the notifying of the message. Instead, the incoming call is just received and the information on the message is stored in a memory.

Normally, the portable radio information terminal is put in the message-notification mode. When a predetermined point of time is reached or the user enters a command to switch the operating mode, the portable radio information terminal transits from the message-notification mode to the message-storage mode. In this way, it is possible to solve a problem of a disturbance caused by ringing sound of a bell generated at the inconvenient times or during the sleeping period of time.

By the way, it is desirable to provide the portable radio information terminal with a function to display a message on the screen so as to allow the user to easily know whether the portable radio information terminal is in the message notification mode or message-storage mode at the present time. For this reason, there has been proposed a configuration wherein the portable radio information terminal is provided with a special display mark or an icon for displaying the fact that the portable radio information terminal is in the message-storage mode at the present time, and the special display mark displayed on the screen is turned on during the message-storage mode.

However, it is necessary to make a display screen panel embedded in the portable radio information terminal small in size along as part of an effort made in recent years to make the portable radio information terminal compact. On the other hand, the amount of a message text to be displayed on the screen exhibits an increasing trend so that it is desirable to provide a portable radio information terminal with a configuration having an area on the screen for displaying a message text as large as possible.

That is to say, it is necessary to reduce the area on the screen other than the area for displaying a message text as much as possible. Thus, it is not wise to design a portable radio information terminal into a configuration wherein a number of display marks including the special icon for the message-storage mode described above are displayed on the screen.

SUMMARY OF THE INVENTION

It is thus an object of the present invention addressing the problems encountered in a portable radio information terminal having the conventional screen configuration as described above to provide a portable radio information terminal capable of displaying information on a limited area of the screen with a high degree of efficiency and a message-notifying method for the portable radio information terminal.

According to a screen displaying method for a portable radio information terminal including a radio-wave receiving means as in one embodiment of the present invention, an operation to at least display displays marks of message-notifying devices on a screen of an image displaying unit is halted if the portable radio information terminal has been set in a message-storage mode for suppressing an operation to notify the user of a message in the event of an incoming information signal conveying the message. As a result, the message-storage mode can be recognized with ease.

In addition, since it is not necessary to prepare a display mark specially used to indicate a message-storage mode, the area of the screen can be used with a higher degree of efficiency.

In a portable radio information terminal according to another embodiment of the present invention, there are provided at least three means including a display-mark turning on/off means used for displaying a display mark of a selected message-notifying device on a screen of an image displaying unit in a message-notification mode or halting an operation to display display marks of all message-notifying devices including a selected message-notifying device in a message-storage mode. Thus, in the message-storage mode, an operation carried out by a selected message-notifying device to notify the user of an incoming information signal and an operation to display display marks of all message-notifying devices are halted. As a result, the message-storage mode can be recognized from a displayed screen with ease.

In addition, since it is not necessary to prepare a display mark specially used to indicate a message-storage mode, the area of the screen can be used with a higher degree of efficiency.

In a recording medium according to another embodiment of the present invention, there are stored at least three means each as a program, that is, a procedure that can be fetched for execution by a computer. The three means include a display-mark turning on/off means used displaying a display mark of a selected message-notifying device on a screen of an image displaying unit in a message-notification mode or halting an operation to display display marks of all message-notifying devices including a selected message-notifying device in a message-storage mode.

Thus, by incorporating the recording medium in a portable radio information terminal having a central processing unit, an input device, the image displaying unit and a message-storage memory as a memory for storing operating procedures to be executed by a central processing unit and by letting the central processing unit sequentially execute the three means each stored in the recording medium as an operating procedure, it is possible to easily provide the portable radio information terminal with a function to halt an operation carried out by a selected message-notifying device to notify the user of an incoming information signal and an operation to display display marks of all message-notifying devices in the message-storage mode.

In a storage unit of a microcomputer according to another embodiment there are stored at least three means each as a program that can be fetched for execution by a computer. The three means include a display-mark turning on/off means used for displaying a display mark of a selected message-notifying device on a screen of an image displaying unit in a message-notification mode or halting an operation to display display marks of all message-notifying devices including a selected message-notifying device in a message-storage mode.

Thus, by incorporating the microcomputer in a portable radio information terminal equipped with components including a communication mechanism unit, a memory unit for recording a received message, an input device used for entering an input command, the message-notifying units, the image displaying unit for displaying information such as a message and a power-supply circuit, it is possible to implement the portable radio information terminal having a function to halt an operation carried out by a selected message-notifying device to notify the user of an incoming information signal and an operation to display display marks of all the message-notifying devices in the message-storage mode in a simple configuration.

According to a screen displaying method for a portable radio information terminal including an image displaying unit as in another embodiment of the present invention, at least one of display marks of message-notifying means is put in a blanking state on a screen of the image displaying unit if the portable radio information terminal has been set in a message-storage mode for suppressing an operation to notify the user of a message in the event of an incoming information signal conveying the message. As a result, the message-storage mode can be recognized with ease.

In addition, since it is not necessary to prepare a display mark specially used to indicate a message-storage mode, the area of the screen can be used with a higher degree of efficiency.

In a portable radio information terminal according to another embodiment of the present invention, there are provided at least four means including a display-mark turning-on means used for turning on a display mark of a selected message-notifying device displayed on a screen of an image displaying unit in a message-notification mode and a means used for putting at least one of display marks of message-notifying means displayed on the screen of the image displaying unit in a blanking state in a message-storage mode. As a result, the message-storage mode can be recognized from a displayed screen with ease from the winking state of at least one of the display marks of the message-notifying means displayed on a screen of the image displaying unit. In addition, since it is not necessary to prepare a display mark specially used to indicate a message-storage mode, the area of the screen can be used with a higher degree of efficiency.

In a recording medium according to another embodiment of the present invention, there are stored at least four means each as a program, that is, a procedure that can be fetched for execution by a computer. The four means include a display-mark turning-on means used for displaying a display mark of a selected message-notifying device on a screen of an image displaying unit in a message-notification mode and a means used for putting at least one of display marks of message-notifying means displayed on the screen of the image displaying unit in a blanking state in a message-storage mode.

Thus, by incorporating the recording medium in a portable radio information terminal having a central processing unit, an input device, the image displaying unit and a message-storage memory as a memory for storing operating procedures to be executed by a central processing unit and by letting the central processing unit sequentially execute the four means each stored in the recording medium as an operating procedure, it is possible to easily provide the portable radio information terminal with a function to halt an operation carried out by a selected message-notifying device to notify the user of an incoming information signal and a function to put at least one of the display marks of the message-notifying means displayed on the screen of the image displaying unit in a blanking state in the message-storage ode.

In a storage unit of a microcomputer according to another embodiment the present invention, there are stored at least four means each as a program that can be fetched for execution by a computer. The four means include a display-mark turning-on means used for turning on a display mark of a selected message-notifying device displayed on a screen of an image displaying unit in a message-notification mode and a means used for putting at least one of display marks of message-notifying means displayed on the screen of the image displaying unit in a blanking state in a message-storage mode.

Thus, by incorporating the microcomputer in a portable radio information terminal equipped with components including a communication mechanism unit, a memory unit for recording a received message, an input device used for entering an input command, the message-notifying units, the image displaying unit for displaying information such as a message and a power-supply circuit, it is possible to implement the portable radio information terminal having a function to halt an operation carried out by a selected message-notifying device to notify the user of an incoming information signal and turn on a display mark of a selected message-notifying device displayed on the screen of the image displaying unit in a message-notification mode and a function to put at least one of the display marks of the message-notifying means displayed on the screen of the image displaying unit in a blanking state in a message-storage mode.

DETAILED DESCRIPTION OF THE PREFERRED EMBODIMENTS

The present invention will become more apparent from the following detailed description of some preferred embodiments with reference to the accompanying diagrams. It should be noted that the embodiment described below is no more than a preferred example showing the essential configuration and operation of the present invention. Thus, the embodiment may have limitations which are desirable from the technological-configuration point of view. However, the scope of the present invention is not limited to the embodiment unless otherwise specified explicitly in a description to limit the scope of the present invention.

Figure 1:
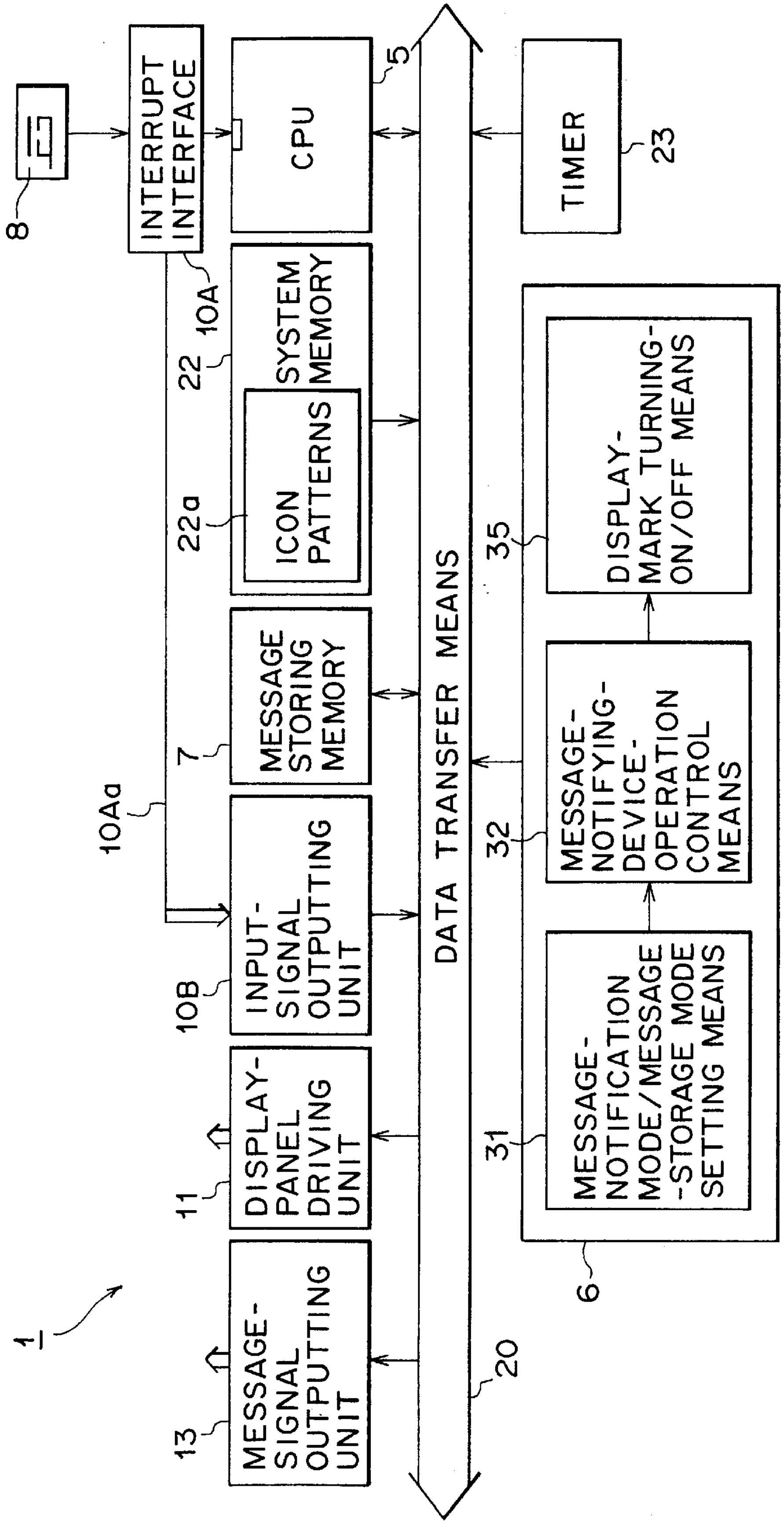
FIG. 1 is a block diagram showing the configuration of main components composing a microcomputer employed in a pager serving as a portable radio information terminal implemented by a first embodiment of the present invention.
Figure 2:
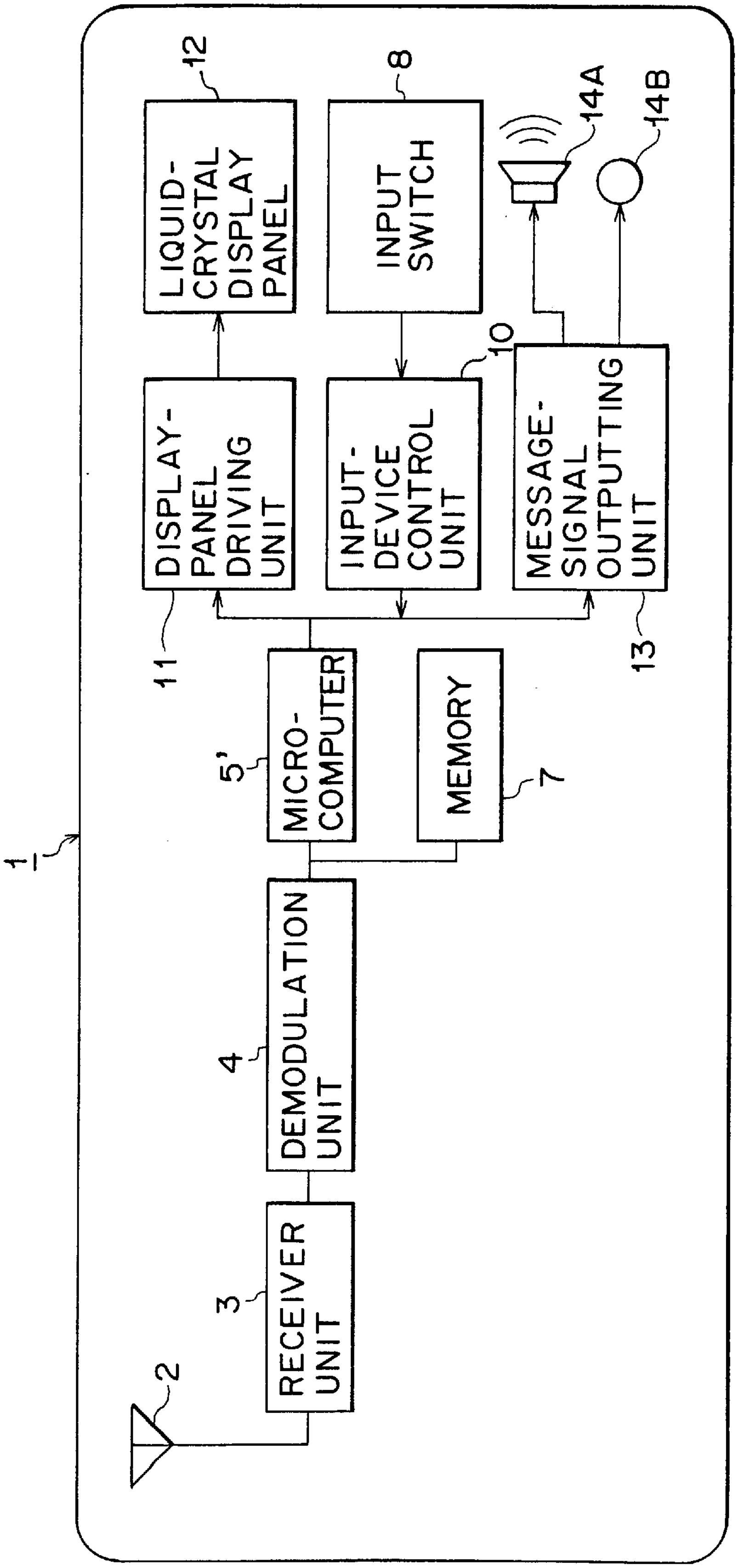
FIG. 2 is a block diagram showing a complete configuration of the portable radio information terminal shown in FIG. 1.
Figure 3:
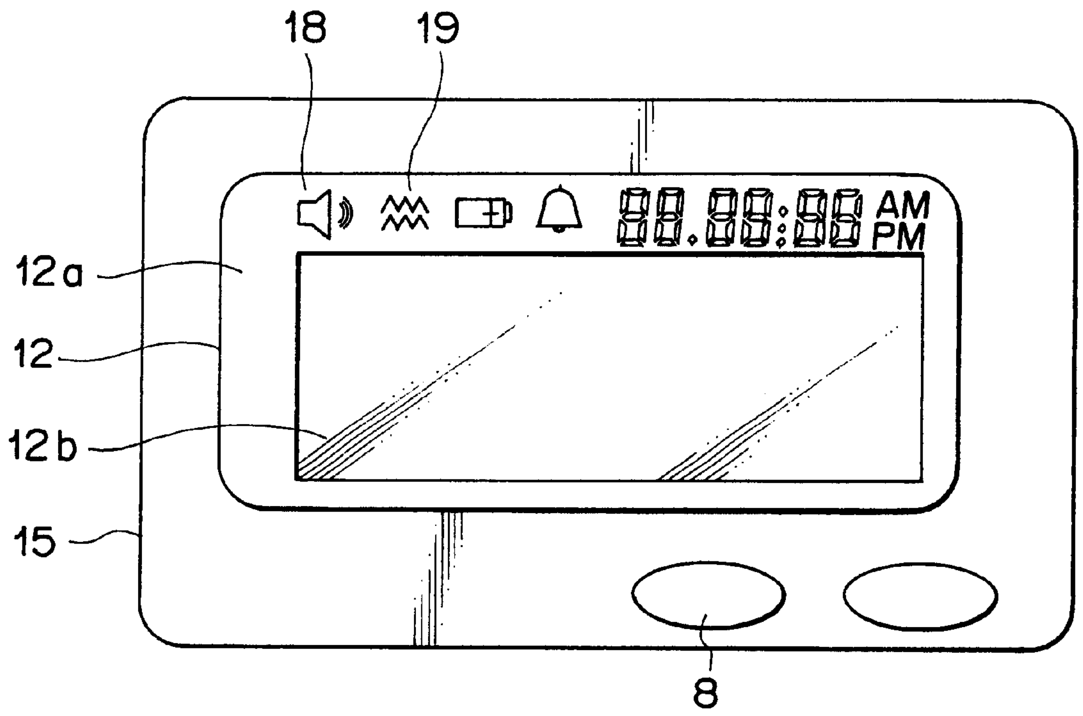
FIG. 3 is a diagram showing a front view of the external appearance of the portable radio information terminal shown in FIG. 1 and 2.

FIG. 1 is a block diagram showing the configuration of main components composing a microcomputer employed in a portable radio information terminal implemented by a first embodiment of the present invention. FIG. 2 is a block diagram showing a complete configuration of the portable radio information terminal employing the microcomputer shown in FIG. 1. FIG. 3 is a diagram showing a front view of the external appearance of the portable radio information terminal shown in FIGS. 1 and 2.

Used as a pager, the portable radio information terminal 1 provided by the present invention serves as a communication means which comprises an antenna 2, a receiver unit 3 and a demodulation unit 4 as shown in FIG. 2. The antenna 2 receives a radio wave conveying an information signal from a transmitter such as a radio base installed at a remote location. Connected to the antenna 2, the receiver unit 3 amplifies and detects the signal received by the antenna 2. Connected to the receiver unit 3, the demodulation unit 4 serves as a decoder for decoding a signal output by the receiver unit 3 to produce code information.

In addition, the demodulation unit 4 also has an A/D, converter for generating digital information. The demodulation unit 4 further has a function to compare the code information obtained as a result of decoding with an ID code to form a judgment as to whether or not the received information signal is indeed a signal destined for this portable radio information terminal 1. The ID code is recorded in advance in an ID memory unit implemented typically by an EEPROM. It should be noted that the ID memory unit itself is not shown in the figure. A signal output by the demodulation unit 4 is supplied to a microcomputer 5'.

The microcomputer 5' is further connected to a message storing memory unit 7 which is implemented typically by an SRAM.

The microcomputer 5' is a component for carrying out data processing and input/output processing. To put it in detail, the microcomputer 5' executes a variety of programs or executable procedures stored in advance in ROM units internal and external to the microcomputer 5' to read in an input signal received from an input device to be described later, to write data into a file on the message storing memory unit 7, to create or update a TOC (Table of Contents), to read out a file from the message storing memory unit 7 and to control all operations of the portable radio information terminal 1 including an operation to display information such as a message indicating existence of an incoming signal and warnings including an alarm indicating a voltage abnormality on a display screen.

A message included in the code information produced by the demodulation unit 4 from a received signal is written and stored in the message storing memory unit 7. The message is read out back from the message storing memory unit 7 to be displayed on a display screen. The message storing memory unit 7 can also be implemented by a non-volatile storage device such as a flash memory and an EEPROM in addition to the SRAM described above.

Operated by the user, the input device mentioned above is implemented by an input switch 8 connected to an input-device control unit 10 which is connected to the microcomputer 5'. A signal generated by the input switch 8 is supplied to the microcomputer 5' by way of the input-device control unit 10.

The microcomputer 5' is connected to a display-panel driving unit 11. Also connected to the display-panel driving unit 11 is a Liquid crystal display panel 12 for displaying a screen. The display-panel driving unit 11 and the Liquid crystal display panel 12 form an image displaying unit.

A display signal output by the microcomputer 5' is transmitted to the display-panel driving unit 11 which supplies a driving signal to the Liquid crystal display panel 12. Driven by the driving signal, the Liquid crystal display panel 12 forms a screen.

The microcomputer 5' is also connected to a message-signal outputting unit 13 which is connected to a speaker 14A used as an audio-message-notifying device and a vibrator 14B serving as a vibration-message-notifying device.

The microcomputer 5' outputs an operation signal to drive the speaker 14A serving as the audio-message-notifying device or a vibrator 14B serving as a vibration-message-notifying device selected in advance by the user by way of the message-signal outputting unit 13 for converting the operation signal into an audio signal for driving the speaker 14A or into a motor driving signal for driving the vibrator 14B.

The microcomputer 5', the input-device control unit 10 and other components described above constitute a control means. Main components of the microcomputer 5' shown in FIG. 1 are described as follows.

As shown in the figure, connected to a data bus serving as a data transfer means 20 are components such as the CPU 5, a system memory unit 22, a timer 23, a ROM unit 6, the message storing memory unit 7, the display-panel driving unit 11 and the message-signal outputting unit 13.

Thus, the CPU 5 is capable of exchanging data with the system memory unit 22, the timer 23, the ROM unit 6, the message storing memory unit 7, the input-signal processing unit 10B, the display-panel driving unit 11, the message-signal outputting unit 13 and the input-signal processing unit 10B through the data transfer means 20.

The system memory unit 22 is used for storing a variety of control procedures for controlling all operations of the portable radio information terminal 1 as programs which can be executed by the CPU 5.

Patterns of display marks or icons appearing on the screen are also stored in the system memory unit 22.

On the other hand, the ROM unit 6 is used for storing mainly a variety of procedures relating to application programs which can be executed by the CPU 5. The ROM unit 6 is implemented by a storage device such as a read-only MOS memory or a flash memory.

An input signal generated by the input switch 8 is converted by an interrupt interface unit 10A into an interrupt signal supplied to the CPU 5 by way of an interrupt receiving terminal of the CPU 5. The interrupt signal causes the CPU 5 to transit to an interrupt processing phase.

Next, a variety of means stored in the ROM unit 6 are explained as follows.

As shown in the figure, a message-notification mode/message-storage mode setting means 31, a message-notifying-device-operation control means 32 and a display-mark turning-on/off means 35 are stored in the ROM unit 6 each as a program, that is, a procedure which can be executed by the CPU 5.

The message-notification mode/message-storage mode setting means 31 sets the portable radio information terminal 1 in a message-notification mode for notifying the user of a message in the event of an incoming information signal conveying the message or in a message-storage mode for halting an operation to notify the user of a message in the event of an incoming information signal conveying the message.

The message-notifying-device-operation control means 32 enables a selected message-notifying device to notify the user of an incoming information signal in the event of the incoming information signal if the portable radio information terminal 1 has been set in the message-notification mode for notifying the user of a message in the event of an incoming information signal conveying the message or prevents a selected message-notifying device from notifying the user of an incoming information signal in the event of the incoming information signal if the portable radio information terminal 1 has been set in the message-storage mode for halting an operation to notify the user of a message in the event of an incoming information signal conveying the message.

The display-mark turning on/off means 35 displays a display mark of a selected message-notifying device on the screen of the image displaying unit if the portable radio information terminal 1 has been set in the message-notification mode for notifying the user of a message in the event of an incoming information signal conveying the message or halts an operation to display display marks of all message-notifying devices including a selected message-notifying device if the portable radio information terminal 1 has been set in the message-storage mode for halting an operation to notify the user of a message in the event of an incoming information signal conveying the message.

Any program format can be used for prescribing the means described above as long as the program can be executed directly or indirectly. It is thus desirable to adopt an absolute-binary addressing format even though a relocatable-binary format which needs readdressing at execution time is also acceptable. In the case of the latter format, however, it is necessary to keep a linkage means in the system memory 22 as a resident tool.

FIG. 3 is a diagram showing a front view of the external configuration of the portable radio information terminal 1 implemented by the embodiment. The configuration of the portable radio information terminal 1 implemented by the embodiment is explained by referring to FIG. 3 as follows.

The portable radio information terminal 1 implemented by the embodiment is accommodated in a thin hexahedron cabinet 15. At about the center of the front face of the cabinet 15, there is provided a Liquid crystal display panel 12 for displaying a message, a date and/or the time of the day.

At a position on the lower side adjacent to the Liquid crystal display panel 12, an input switch 8 functioning as an escape key is embedded in such a way that the input switch 8 can be pressed and operated with ease. The input switch 8 is operated by the user to enter a command to stop alarming sound generated as a message indicating an incoming call or a command to control an operation.

The screen of the Liquid crystal display panel 12 comprises a message display area 12*b* at the center thereof for displaying information on an arriving message and an icon display area 12*a* around the message display area 12*b* for displaying a variety of icons.

The message displaying area 12*b* is capable of accommodating a message text composed of up to typically 4 lines each comprising a maximum of typically 20 characters.

Examples of icons displayed in the icon display area 12*a* are a ringing-sound-message-notification icon 18 and a vibration-message-notification icon 19. When an incoming signal is received by the portable radio information terminal 1 set in the message-notification mode for notifying the user of a message conveyed by the incoming signal, either the ringing-sound-message-notification icon 18 or the vibration-message-notification icon 19 is turned on depending respectively upon whether the ringing-sound-message-notifying device or the vibration-message-notifying device has been selected and the icon of the deselected device is turned off.

The configuration of the portable radio information terminal 1 implemented by the embodiment has been described so far. Next, the operation of the portable radio information terminal 1 is explained as follows.

First of all, normal operations to receive a radio signal and to display a message are discussed by mainly referring mainly to FIG. 2.

When a radio wave conveying information or a message destined for a specific portable radio information terminal 1 is transmitted from a radio transmitting stat ion, the terminal 1 receives the radio wave using the antenna 2. In the receiver unit 3, the radio wave is subjected to signal processing such as conversion into a signal having an intermediate frequency, amplification and detection. In the demodulation unit 4, after the fact that the message is indeed destined for the portable radio information terminal 1 has been confirmed, the received information signal is decoded. The decoded information signal is finally stored in the message storing memory unit 7 in an operation controlled by the microcomputer 5'.

The CPU 5 employed in the microcomputer 5' controls the operation of the portable radio information terminal 1 by execution of control programs stored in the ROM unit 6. First of all, the CPU 5 forms a judgment as to whether or not an information signal has been received. If an information signal is judged to have been received, the display-panel driving unit 11 is operated to display a message conveyed by the received information signal read out from the message storing memory unit 7 on the Liquid crystal display panel 12 as a text composed of up to typically 4 lines each comprising a maximum of typically 20 alphabetical and numerical characters.

In addition, when an information signal is judged to have been received, the microcomputer 5' issues a command to operate the message-signal outputting unit 13. Operated by the command, the message-signal outputting unit 13 supplies an alarm signal to the speaker 14A to generate sound or a motor driving signal to the vibrator 14B for making the user aware of the fact that an information signal has been received.

Next, the operation of the portable radio information terminal 1 is explained.

Figure 4:
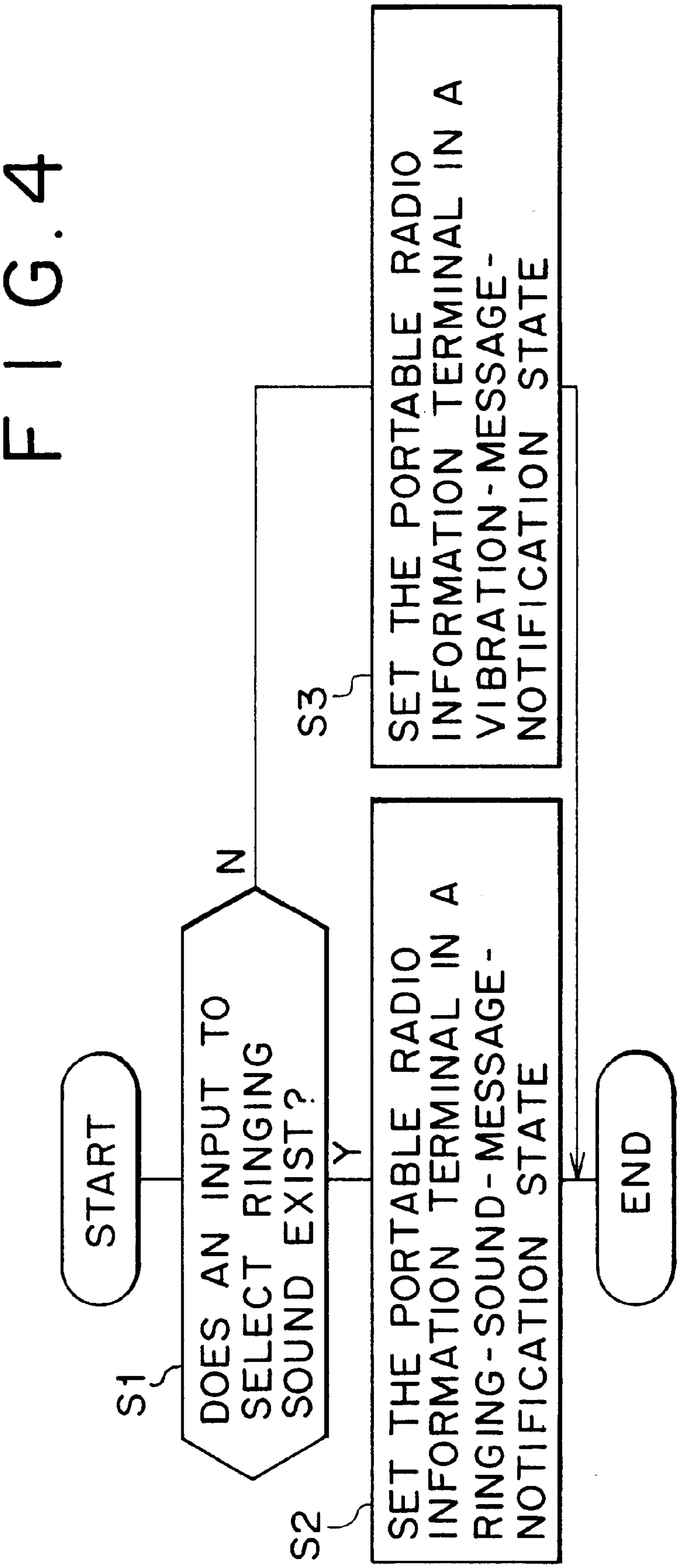
FIG. 4 shows a flowchart representing processing carried out by the portable radio information terminal implemented by a first embodiment of the present invention to set a message-notifying device selected by the user.

FIG. 4 shows a flowchart representing processing to set a specified message-notifying device carried out by the portable radio information terminal 1 implemented by a first embodiment of the present invention.

As shown in the figure, the flowchart begins with a step S1 to form a judgment as to whether or not the user has entered an input to specify the ringing-sound-message-notifying device. If the user has entered an input to select the ringing-sound-message-notifying device, the flow of the processing goes on to a step S2 at which the portable radio information terminal 1 enables the ringing-sound-message-notifying device to notify the user of an incoming information signal in the event of the incoming information signal. If the user has not entered an input to select the ringing-sound-message-notifying device, on the other hand, the flow of the processing goes on to a step S3 at which the portable radio information terminal 1 enables the vibration-message-notifying device to notify the user of an incoming information signal in the event of the incoming information signal.

Figure 5:
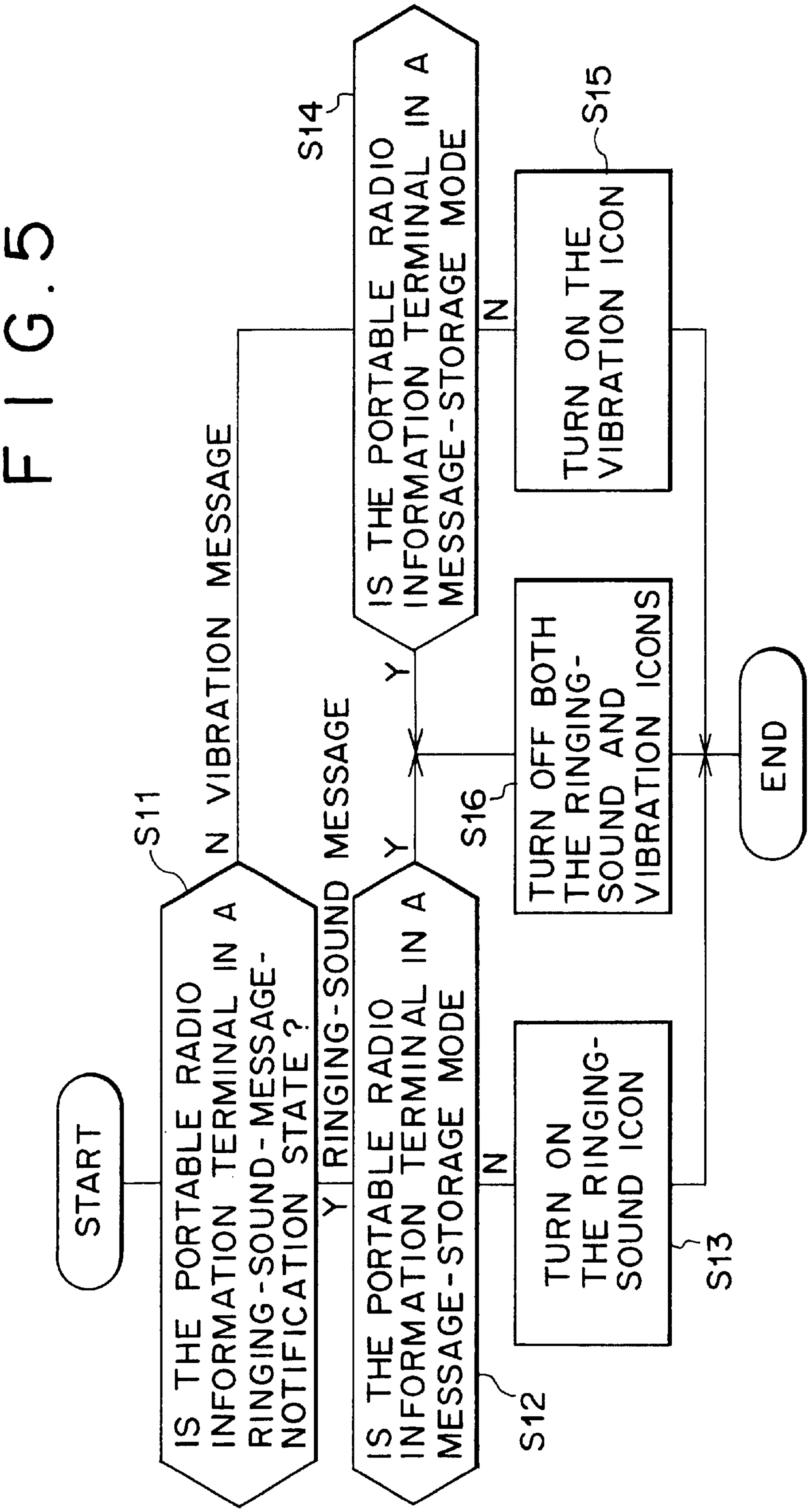
FIG. 5 shows a flowchart representing processing carried out by the portable radio information terminal implemented by the first embodiment of the present invention to display an operating mode.

FIG. 5 shows a flowchart representing processing to display an operating mode carried out by the portable radio information terminal 1 implemented by a first embodiment of the present invention.

As shown in the figure, the flowchart begins with a step S11 at which the CPU 5 forms a judgment as to whether or not the ringing-sound-message-notifying device has been selected. If the ringing-sound-message-notifying device has been selected, the flow of the processing goes on to a step S12 at which the CPU 5 executes the message-notifying-mode/message-storage-mode setting means 31 stored in the ROM unit 6. The message-notifying-mode/message-storage-mode setting means 31 sets the portable radio information terminal 1 in a message-notification mode or in a message-storage mode in dependence on what the user desires or the time of the day which is obtained by referring to a timer 23. For example, if the present time is in a time band to suppress notification of a message, the message-notifying-mode/message-storage-mode setting means 31 sets the portable radio information terminal 1 in a message-storage mode.

Then, the CPU 5 executes the message-notifying-device-operation control means 32 stored in the ROM unit 6. If the message-notifying-mode/message-storage-mode setting means 31 has set the portable radio information terminal 1 in a message-notification mode at the step S12, the flow of the processing goes on to a step S13 at which the message-notifying-device-operation control means 32 passes a signal to turn on the ringing-sound-message-notification icon 18 shown in FIG. 3 to the display-mark turning on/off means 35 stored in the ROM unit 6 to be executed next by the CPU 5. If the message-notifying-mode/message-storage-mode setting means 31 has set the portable radio information terminal 1 in a message-storage mode at the step S12, on the other hand, the flow of the processing goes on to a step S16 at which the message-notifying-device-operation control means 32 passes a signal to turn off both the ringing-sound-message-notification icon 18 and the vibration-message-notification icon 19 shown in FIG. 3 to the display-mark turning on/off means 35 to be executed next by the CPU 5.

At the step S13, the display-mark turning on/off means 35 turns on the ringing-sound-message-notification icon 18 displayed on the screen in accordance with the signal passed thereto by the message-notifying-device-operation control means 32.

At the step S16, on the other hand, the display-mark turning on/off means 35 turns off both the ringing-sound-message-notification icon 18 and the vibration-message-notification icon 19 in accordance with the signal passed thereto by the message-notifying-device-operation control means 32.

If the outcome of the judgment formed at the step S11 indicates that the vibration-message-notifying device has been selected, on the other hand, the flow of the processing goes on to a step S14 at which the CPU 5 executes the message-notifying-mode/message-storage-mode setting means 31 stored in the ROM unit 6. The message-notifying-mode/message-storage-mode setting means 31 sets the portable radio information terminal 1 in a message-notification mode or in a message-storage mode in dependence on what the user desires or the time of the day which is obtained by referring to the timer 23. For example, if the present time is in a time band to suppress notification of a message, the message-notifying-mode/message-storage-mode setting means 31 sets the portable radio information terminal 1 in a message-storage mode.

Then, the CPU 5 executes the message-notifying-device-operation control means 32 stored in the ROM unit 6. If the message-notifying-mode/message-storage-mode setting means 31 has set the portable radio information terminal 1 in a message-notification mode at the step S14, the flow of the processing goes on to a step S15 at which the message-notifying-device-operation control means 32 passes a signal to turn on the vibration-message-notification icon 19 shown in FIG. 3 to the display-mark turning on/off means 35 stored in the ROM unit 6 to be executed next by the CPU 5. If the message-notifying-mode/message-storage-mode setting means 31 has set the portable radio information terminal 1 in a message-storage mode at the step S14, on the other hand, the flow of the processing goes on to the step S16 at which the message-notifying-device-operation control means 32 passes a signal to turn off both the ringing-sound-message-notification icon 18 and the vibration-message-notification icon 19 to the display-mark turning on/off means 35 to be executed next by the CPU 5.

At the step S15, the display-mark turning on/off means 35 turns on the vibration-message-notification icon 19 displayed on the screen in accordance with the signal passed thereto by the message-notifying-device-operation control means 32.

At the step S16, on the other hand, the display-mark turning on/off means 35 turns off both the ringing-sound-message-notification icon 18 and the vibration-message-notification icon 19 in accordance with the signal passed thereto by the message-notifying-device-operation control means 32.

Figure 6:
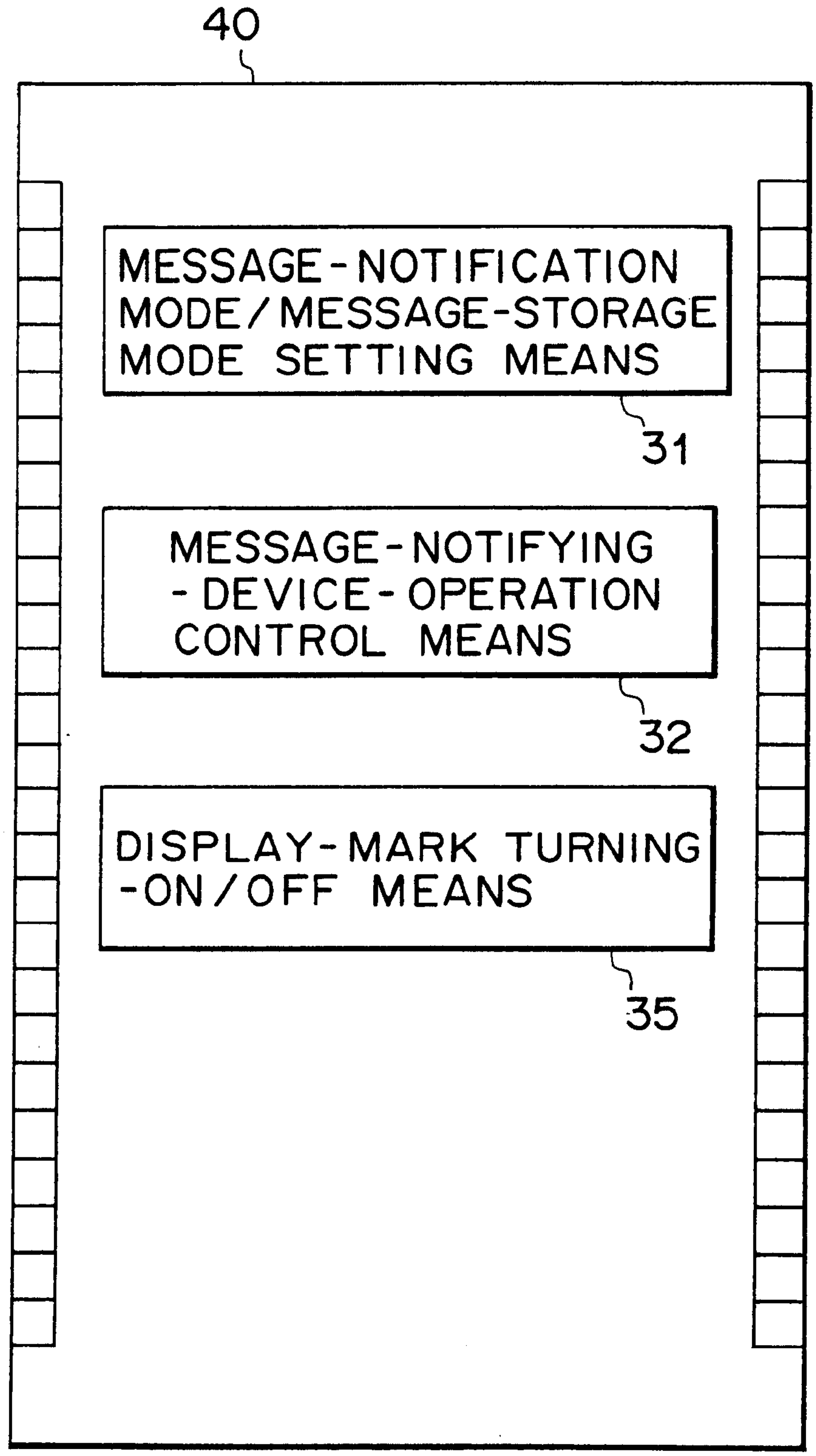
FIG. 6 is an explanatory diagram showing the configuration of a recording medium implemented by a second embodiment of the present invention.

FIG. 6 is an explanatory diagram showing the configuration of a recording medium 40 implemented by a second embodiment of the present invention. The recording medium 40 implemented by the second embodiment of the present invention is explained by referring to this figure as follows.

The recording medium 40 implemented by the second embodiment of the present invention is a single-chip semiconductor memory for storing at least the three means described below. The three means are each a procedure, that is, a program which can be executed by a computer.

The first means is the message-notification mode/message-storage mode setting means 31. The message-notification mode/message-storage mode setting means 31 sets the portable radio information terminal 1 in a message-notification mode for notifying the user of a message in the event of an incoming information signal conveying the message or in a message-storage mode for halting an operation to notify the user of a message in the event of an incoming information signal conveying the message when the message-notification mode/message-storage mode setting means 31 is fetched for execution by a central processing unit employed in the computer.

The second means is the message-notifying-device-operation control means 32, which enables a selected message-notifying device to notify the user of an incoming information signal in the event of the incoming information signal if the portable radio information terminal 1 has been set in the message-notification mode for notifying the user of a message in the event of an incoming information signal conveying the message, or prevents a selected message-notifying device from notifying the user of an incoming information signal in the event of the incoming information signal if the portable radio information terminal 1 has been set in the message-storage mode for halting an operation to notify the user of a message in the event of an incoming information signal conveying the message when the message-notification mode/message-storage mode setting means 31 is fetched for execution by a central processing unit employed in the computer.

The third means is the display-mark turning on/off means 35. The display-mark turning on/off means 35 displays a display mark of a selected message-notifying device on the screen of the image displaying unit if the portable radio information terminal 1 has been set in the message-notification mode for notifying the user of a message in the event of an incoming information signal conveying the message or halts an operation to display display marks of all message-notifying devices including a selected message-notifying device if the portable radio information terminal 1 has been set in the message-storage mode for halting an operation to notify the user of a message in the event of an incoming information signal conveying the message when the message-notification mode/message-storage mode setting means 31 is fetched for execution by a central processing unit employed in the computer.

The recording medium 40 is incorporated in the portable radio information terminal 1 having a central processing unit 5, an input device, an image displaying unit and a message-storage memory 7 as a memory for storing operating procedures to be executed by the central processing unit. By letting the central processing unit 5 sequentially execute the three means which are each stored in the recording medium 40 as an operating procedure, it is possible to implement a portable radio information terminal 1 having a function implemented by the message-notifying-mode/message-storage-mode setting means 31 to switch the portable radio information terminal 1 to the message-storage mode, a function implemented by the message-notifying-device-operation control means 32 to halt the operation of a selected message-notifying device in the message-storage mode and a function implemented by the display-mark turning on/off means 35 to halt the operation to display display marks of all the message-notifying devices on the image displaying unit in the message-storage mode.

The recording medium 40 provided by this embodiment can be applied to mainly a flash memory. In addition, the recording medium can be applied to a read-only MOS memory, an SRAM, an EPROM, an EEPROM and the other so-called non-volatile semiconductor recording mediums.

In addition, the recording medium 40 can also be applied to an optical recording medium, an optical magnetic recording medium and a magnetic recording medium as well.

Figure 7:
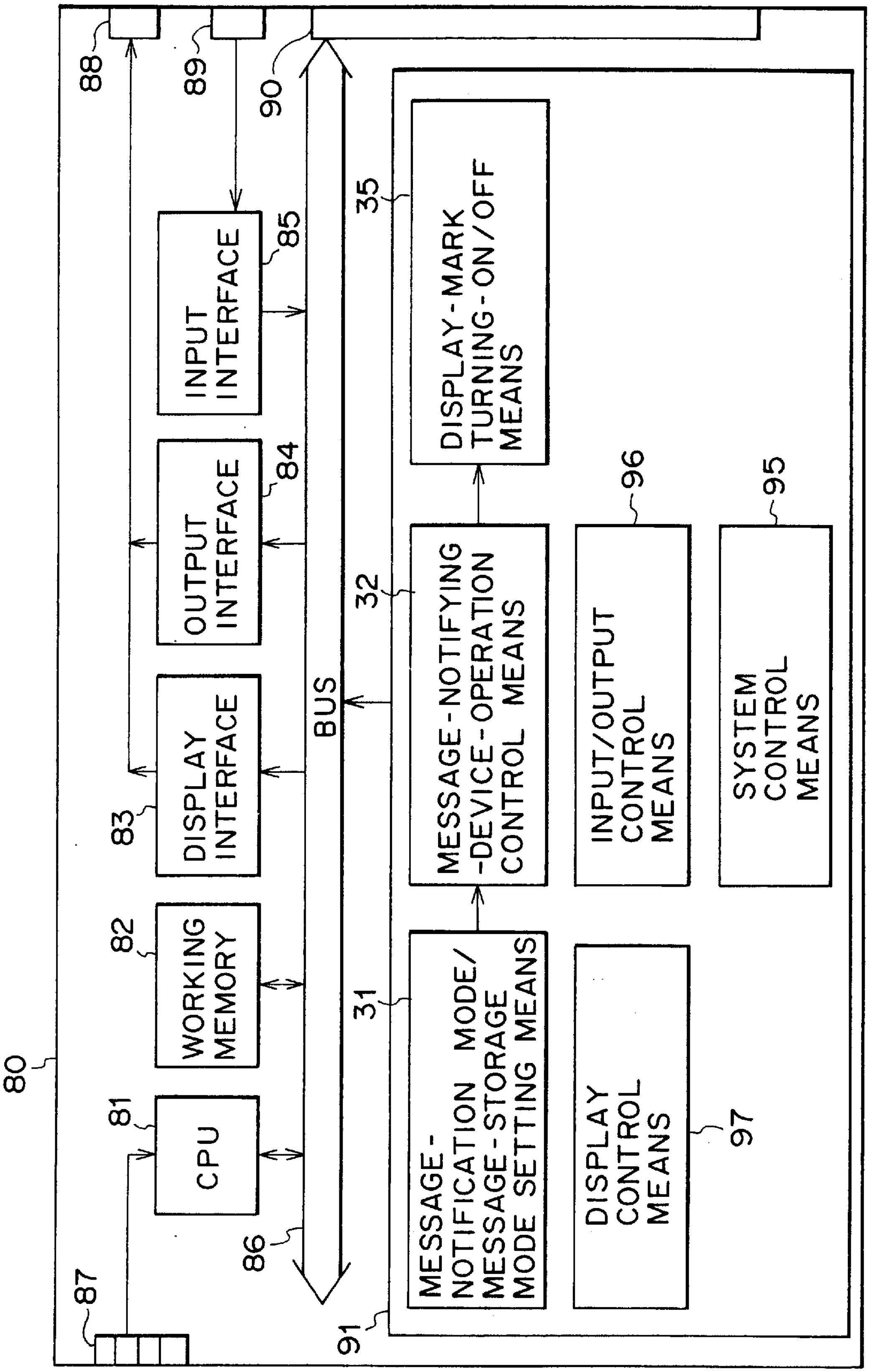
FIG. 7 is a block diagram showing the configuration of a microcomputer implemented by a third embodiment of the present invention.

FIG. 7 is a block diagram showing the configuration of a microcomputer 80 implemnted by a third embodiment of the present invention. The microcomputer 80 implemented by the third embodiment of the present invention is explained by referring to this figure as follows.

Designed into a one-chip product, the microcomputer 80 implemented by the third embodiment of the present invention comprises a CPU (central processing unit) 81, a working memory unit 82, a display interface unit 83, an output interface unit 84, an input interface unit 85 and a memory unit 91 which are connected to each other by an internal bus 86 as shown in the figure.

External pins provided on the chip of the microcomputer 80 are interrupt input pins 87 connected to an interrupt input terminal of the CPU 81, an output pins 88 connected to the display interface unit 83 and the output interface unit 84, input pins 89 connected to the input interface unit 85 and conmon bus pins 90 connected to the internal bus 86.

The memory unit 91 is used for storing programs that can be executed by the CPU 81. The programs include a system control means 95, an input/output control means 96, a display control means 97, the message-notifying-mode/message-storage-mode setting means 31, the message-notifying-device-operation control means 32 and the display-mark turning on/off means 35.

The system control means 95 is executed to control not only operations of the components inside the chip of the microcomputer 80 but also operations of the whole portable radio information terminal 1 including the microcomputer 80 itself and operations of components in the portable radio information terminal 1 other than the microcomputer 80. The procedure implementing this system control means is adapted to the portable radio information terminal 1 provided by the present invention.

By the same token, the input/output control means 96 is executed to control not only exchanges of data and signals among the components inside the chip of the microcomputer 80 but also exchanges of data and signals between the whole portable radio information terminal 1 including the microcomputer 80 itself as well as components in the portable radio information terminal 1 other than the microcomputer 80 and the external world. The procedure implementing this system control means is adapted to the portable radio information terminal 1 provided by the present invention.

On the other hand, the display control means 97 is executed to control general operations to display a message text on a screen on an image displaying unit connected to the microcomputer 80.

Fetched for execution by the CPU 81 employed in the microcomputer 80, the message-notification mode/message-storage mode setting means 31 sets the portable radio information terminal 1 in a message-notification mode for notifying the user of a message in the event of an incoming information signal conveying the message or in a message-storage mode for halting an operation to notify the user of a message in the event of an incoming information signal conveying the message.

Also fetched for execution by the CPU 81 employed in the microcomputer 80, the message-notifying-device-operation control means 32 enables a selected message-notifying device to notify the user of an incoming information signal in the event of the incoming information signal if the portable radio information terminal 1 has been set in the message-notification mode for notifying the user of a message in the event of an incoming information signal conveying the message or prevents a selected message-notifying device from notifying the user of an incoming information signal in the event of the incoming information signal if the portable radio information terminal 1 has been set in the message-storage mode for halting an operation to notify the user of a message in the event of an incoming information signal conveying the message.

Also fetched for execution by the CPU 81 employed in the microcomputer 80, the third means is the display-mark turning on/off means 35 displays a display mark of a selected message-notifying device on the screen of the image displaying unit if the portable radio information terminal 1 has been set in the message-notification mode for notifying the user of a message in the event of an incoming information signal conveying the message or halts an operation to display display marks of all message-notifying devices including a selected message-notifying device if the portable radio information terminal 1 has been set in the message-storage mode for halting an operation to notify the user of a message in the event of an incoming information signal conveying the message.

By incorporating the microcomputer 80 in a portable radio information terminal 1 equipped with components including a communication mechanism unit, a memory unit for recording a received message, an input device such as a rotary/press input device used for entering an input command, a message-notifying unit, an image displaying unit for displaying information such as a message and a power-supply circuit, it is possible to easily provide the portable radio information terminal 1 with a function implemented by the message-notifying-mode/message-storage-mode setting means 31 to switch the portable radio information terminal 1 to the message-storage mode, a function implemented by the message-notifying-device-operation control means 32 to halt the operation of a selected message-notifying device in the message-storage mode and a function implemented by the display-mark turning on/off means 35 to halt the operation to display display marks of all the message-notifying devices on the image displaying unit in the message-storage mode.

Figure 8:
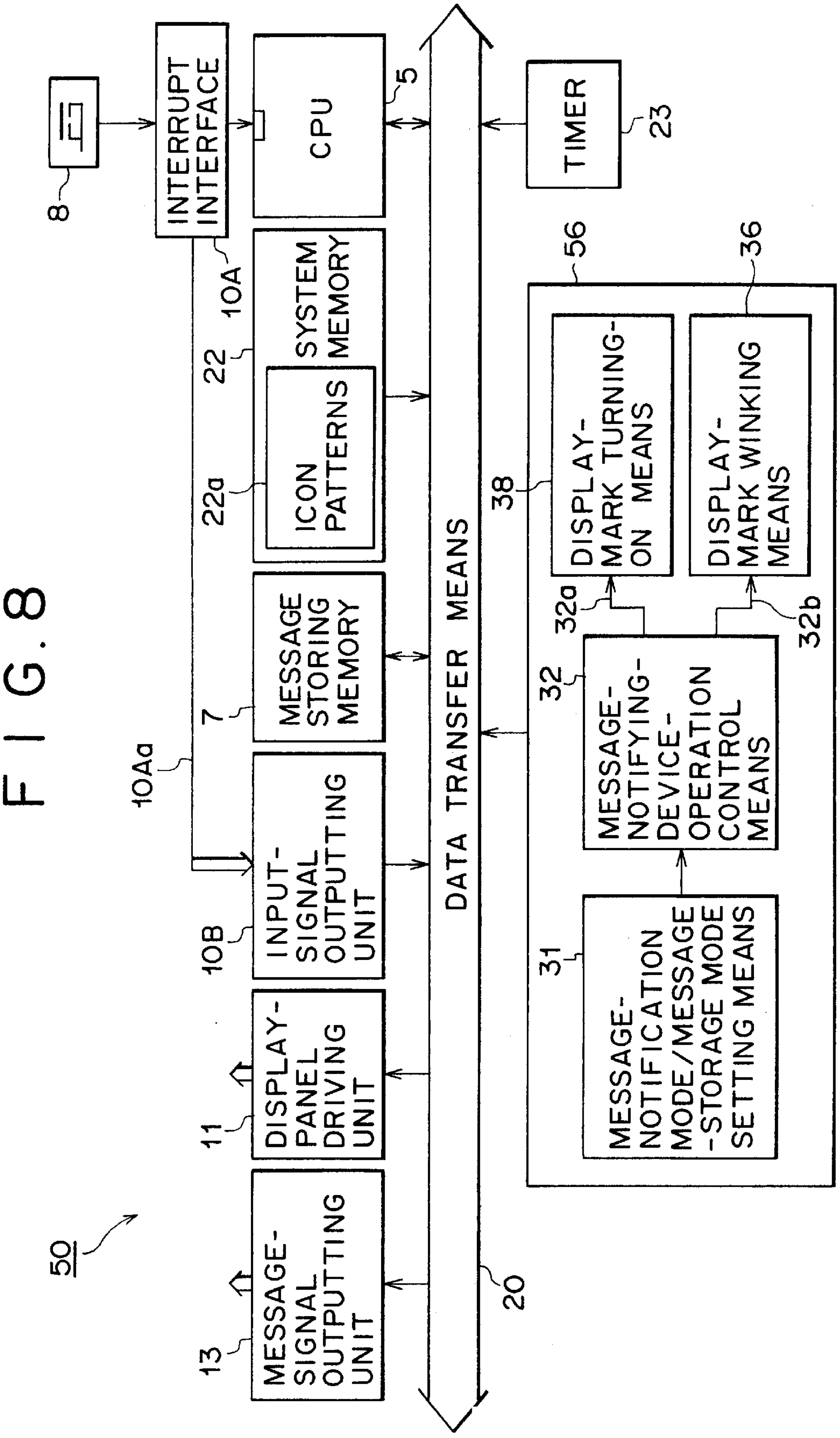
FIG. 8 is a block diagram showing the configuration of main components composing a portable radio information terminal implemented by a fourth embodiment of the present invention.

FIG. 8 is a block diagram showing the configuration of main components constituting a portable radio information terminal 50 implemented by a fourth embodiment of the present invention. It should be noted that components of the configuration shown in FIG. 8 identical with those employed in the portable radio information terminal 1 implemented by the first embodiment shown in FIG. 1 are denoted by the same reference numerals as the latter and their explanation is not repeated.

The message-notification mode/message-storage mode setting means 31, the message-notifying-device-operation control means 32, a display-mark turning-on means 38 and a display-mark winking means 36 are each stored in the ROM unit 56, which is a read-only memory, connected to the data transfer means 20 of the portable radio information terminal 50 implemented by the fourth embodiment as a program, that is, a procedure which can be executed by the CPU 5.

The message-notifying-mode/message-storage-mode setting means 31 and the message-notifying-device-operation control means 32 are the same as their counterparts employed in the portable radio information terminal 1 implemented by the first embodiment.

The display-mark turning-on means 38 is executed to turn on the display mark of a selected message-notifying device displayed on the screen of an image displaying unit only in the message-notification mode for notifying the user of a message in the event of an incoming signal conveying the signal.

The display-mark winking means 36 is executed to put at least one of the display marks of a plurality of message-notifying devices including the selected one displayed on the screen of the image displaying unit in a winking state only in the message-storage mode for halting an operation to notify the user of a message in the event of an incoming signal conveying the message.

Figure 9:
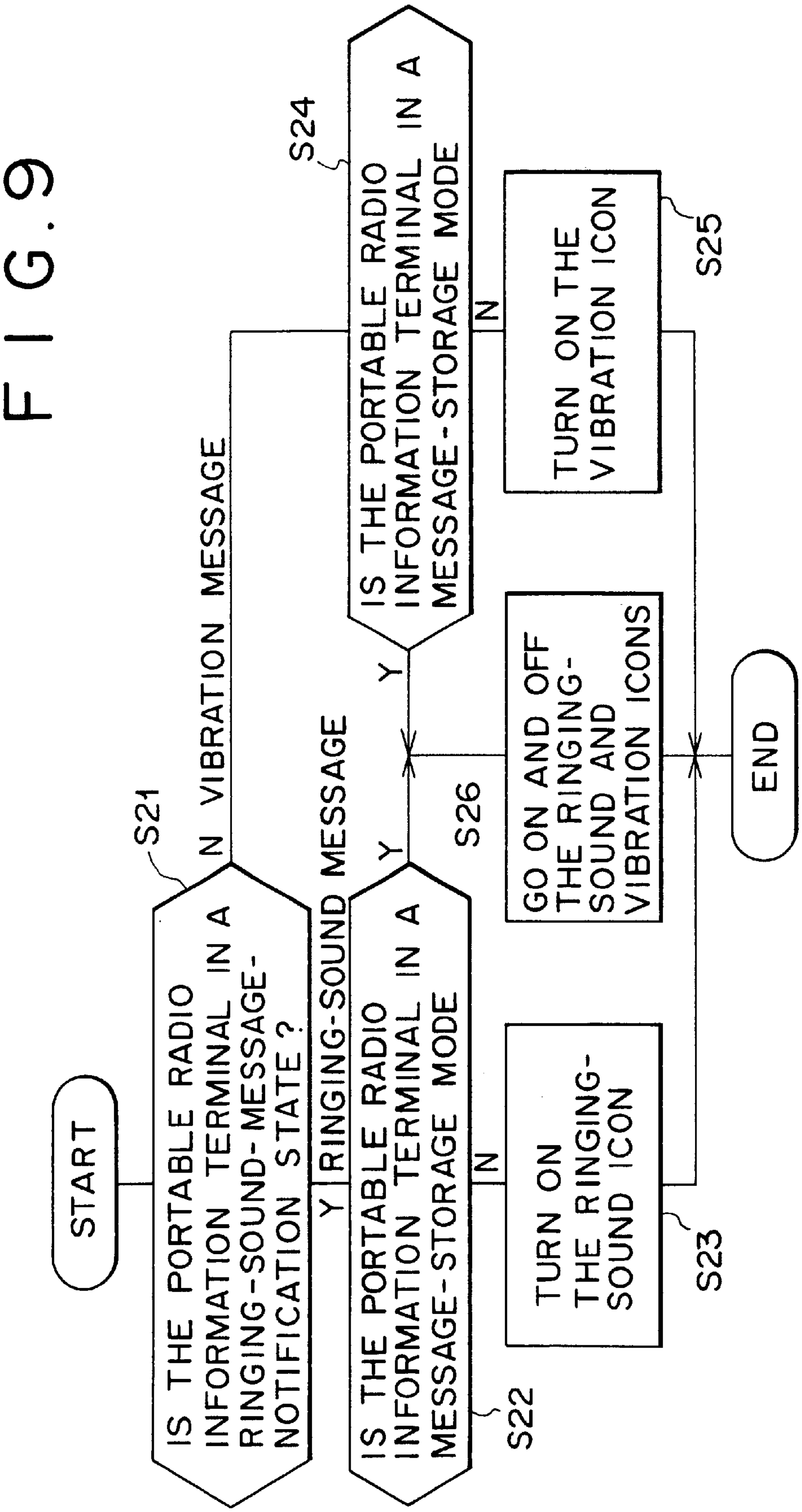
FIG. 9 shows a flowchart representing processing carried out by the portable radio information terminal implemented by the fourth embodiment of the present invention to display an operating mode.

FIG. 9 shows a flowchart representing processing to display a message carried out by the portable radio information terminal 50 implemented by a fourth embodiment of the present invention.

As shown in the figure, the flowchart begins with a step S21 at which the CPU 5 forms a judgment as to whether or not the ringing-sound-message-notifying device has been selected. If the ringing-sound-message-notifying device has been selected, the flow of the processing goes on to a step S22 at which the CPU 5 executes the message-notifying-mode/message-storage-mode setting means 31 stored in the ROM unit 56. The message-notifying-mode/message-storage-mode setting means 31 sets the portable radio information terminal 50 in a message-notification mode or in a message-storage mode in dependence on what the user desires or the time of the day which is obtained by referring to a timer 23. For example, if the present time is in a time band to suppress notification of a message, the message-notifying-mode/message-storage-mode setting means 31 sets the portable radio information terminal 50 in a message-storage mode.

Then, the CPU 5 executes the message-notifying-device-operation control means 32 stored in the ROM unit 56. If the message-notifying-mode/message-storage-mode setting means 31 has set the portable radio information terminal 50 in a message-notification mode at the step S22, the flow of the processing goes on to a step S23 at which the message-notifying-device-operation control means 32 passes a signal to turn on the ringing-sound-message-notification icon 18 shown in FIG. 3 to the display-mark turning-on means 38 stored in the ROM unit 56 to be executed next by the CPU 5.

At the step S23, the display-mark turning-on means 38 turns on the ringing-sound-message-notification icon 18 in accordance with the signal passed thereto by the message-notifying-device-operation control means 32.

If the message-notifying-mode/message-storage-mode setting means 31 has set the portable radio information terminal 50 in a message-storage mode at the step S22, on the other hand, the flow of the processing goes on to a step S26 at which the message-notifying-device-operation control means 32 passes a signal to put both the ringing-sound-message-notification icon 18 and the vibration-message-notification icon 19 shown in FIG. 3 in a winking state to the display-mark winking means 36 stored in the ROM unit 56 to be executed next by the CPU 5.

At the step S26, on the other hand, the display-mark winking means 36 puts both the ringing-sound-message-notification icon 18 and the vibration-message-notification icon 19 in a winking state in accordance with the signal passed thereto by the message-notifying-device-operation control means 32.

If the outcome of the judgment formed at the step S21 indicates that the vibration-message-notifying device has been selected, on the other hand, the flow of the processing goes on to a step S24 at which the CPU 5 executes the message-notifying-mode/message-storage-mode setting means 31 stored in the ROM unit 56. The message-notifying-mode/message-storage-mode setting means 31 sets the portable radio information terminal 50 in a message-notification mode or in a message-storage mode in dependence on what the user desires or the time of the day which is obtained by referring to a timer 23. For example, if the present time is in a time band to suppress notification of a message, the message-notifying-mode/message-storage-mode setting means 31 sets the portable radio information terminal 50 in a message-storage mode.

Then, the CPU 5 executes the message-notifying-device-operation control means 32 stored in the ROM unit 56. If the message-notifying-mode/message-storage-mode setting means 31 has set the portable radio information terminal 50 in a message-notification mode at the step S24, the flow of the processing goes on to a step S25 at which the message-notifying-device-operation control means 32 passes a signal to turn on the vibration-message-notification icon 19 shown in FIG. 3 to the display-mark turning-on means 38 stored in the ROM unit 56 to be executed next by the CPU 5.

At the step S25, the display-mark turning-on means 38 turns on the vibration-message-notification icon 19 in accordance with the signal passed thereto by the message-notifying-device-operation control means 32.

If the message-notifying-mode/message-storage-mode setting means 31 has set the portable radio information terminal 50 in a message-storage mode at the step S24, on the other hand, the flow of the processing goes on to the step S26 at which the message-notifying-device-operation control means 32 passes a signal to put both the ringing-sound-message-notification icon 18 and the vibration-message-notification icon 19 shown in FIG. 3 in a winking state to the display-mark winking means 36 stored in the ROM unit 56 to be executed next by the CPU 5.

At the step S26, on the other hand, the display-mark winking means 36 puts both the ringing-sound-message-notification icon 18 and the vibration-message-notification icon 19 in a winking state in accordance with the signal passed thereto by the message-notifying-device-operation control means 32.

By putting both the ringing-sound-message-notification icon 18 and the vibration-message-notification icon 19 in a winking state in the message-storage mode, the screen displaying method has a merit that, not only is the message-storage mode easy to recognize, but the normal states of the message-notifying function and the message displaying function of the portable radio information terminal 50 can be recognized indirectly.

Figure 10:
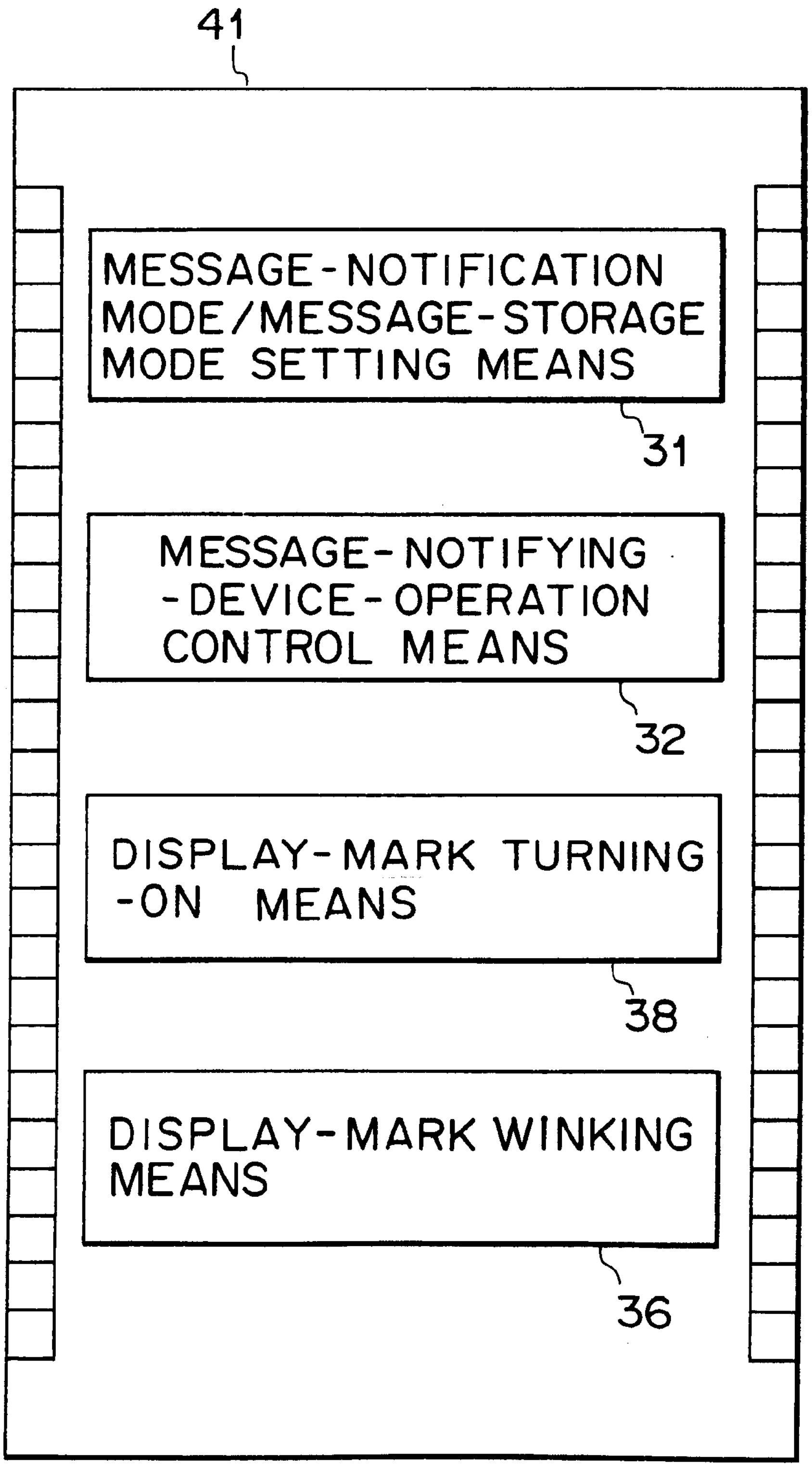
FIG. 10 is an explanatory diagram showing the configuration of a recording medium implemented by a fifth embodiment of the present invention.

FIG. 10 is an explanatory diagram showing the configuration of a recording medium 41 implemented by a fifth embodiment of the present invention. It should be noted that elements of the fifth embodiment identical with their counterparts employed in the recording medium 40 implemented by the second embodiment shown in FIG. 6 are denoted by the same reference numerals as the latter and their explanation is not repeated.

The recording medium 41 implemented by the fifth embodiment of the present invention is a single-chip semiconductor memory for storing at least first to fourth means described below. The four means are each a procedure, that is, a program which can be fetched for execution by a computer.

The first means is the message-notifying-mode/message-storage-mode setting means 31 and the second means is the message-notifying-device-operation control means 32 described earlier.

The third means is the display-mark turning-on means 38. The display-mark turning-on means 38 is fetched for execution by a microcomputer to turn on the display mark of a selected message-notifying device displayed on the screen of an image displaying unit only in the message-notification mode for notifying the user of a message in the event of an incoming signal conveying the message.

The fourth means is the display-mark winking means 36. The display-mark winking means 36 is fetched for execution by a microcomputer to put at least one of the display marks of a plurality of message-notifying devices including the selected one displayed on the screen of the image displaying unit in a winking state only in the message-storage mode for halting an operation to notify the user of a message in the event of an incoming signal conveying the message.

The recording medium 41 is incorporated in the portable radio information terminal 50 having a central processing unit 5, an input device, an image displaying unit and a message-storage memory 7 as a memory for storing operating procedures to be executed by the central processing unit. By letting the central processing unit 5 sequentially execute the four means which are each stored in the recording medium 41 as a procedure, it is possible to implement a portable radio information terminal 50 having a function implemnted by the message-notifying-mode/message-storage-mode setting means 31 to switch the portable radio information terminal 50 to the message-storage mode, a function implemented by the message-notifying-device-operation control means 32 to halt the operation of a selected message-notifying device in the message-storage mode and a function implemented by the display-mark winking means 36 to put at least one of display marks of all the message-notifying devices displayed on the screen of the image displaying unit in a winking state only in the message-storage mode.

The recording medium 41 provided by this embodiment can be applied to mainly a flash memory. In addition, the recording medium can be applied to a read-only MOS memory, an SRAM, an EPROM, an EEPROM and the other so-called non-volatile semiconductor recording mediums.

In addition, the recording medium 41 can also be applied to an optical recording medium, an optical magnetic recording medium and a magnetic recording medium as well.

Figure 11:
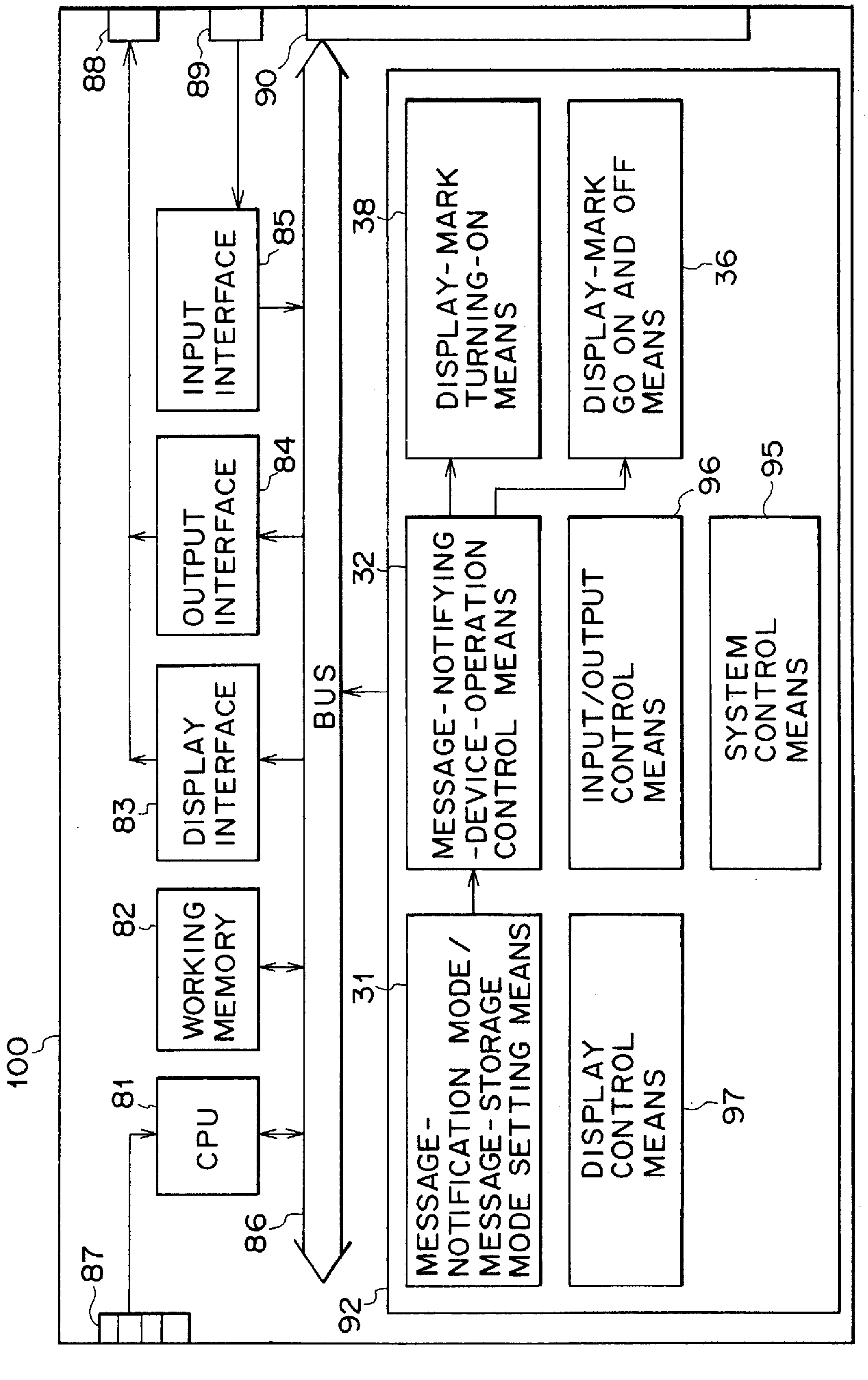
FIG. 11 is a block diagram showing the configuration of a microcomputer implemented by a sixth embodiment of the present invention.

FIG. 11 is a block diagram showing the configuration of a microcomputer 100 implemented by a sixth embodiment of the present invention. It should be noted that components of the sixth embodiment identical with those employed in the microcomputer 80 implemented by the third embodiment shown in FIG. 7 are denoted by the same reference numerals as the latter and their explanation is not repeated.

The memory unit 92 connected to the bus 86 in the microcomputer 100 implemented by the sixth embodiment is used for storing programs that can be executed by the CPU 81. The programs include a system control means 95, an input/output control means 96, a display control means 97, the message-notifying-mode/message-storage-mode setting means 31, the message-notifying-device-operation control means 32, the display-mark turning-on means 38 and the display-mark winking means 36.

The system control means 95, the input/output control means 96, the display control means 97, the message-notifying-mode/message-storage-mode setting means 31 and the message-notifying-device-operation control means 32 are the same as their counterparts employed in the microcomputer 80 implemented by the third embodiment.

The display-mark turning-on means 38 is fetched for execution by the CPU 81 employed in the microcomputer 100 to turn on the display mark of a selected message-notifying device displayed on the screen of an image displaying unit only in the message-notification mode for notifying the user of a message in the event of an incoming signal conveying the message.

The display-mark winking means 36 is fetched for execution by the CPU 81 employed in the microcomputer 100 to put at least one of the display marks of a plurality of message-notifying devices including the selected one displayed on the screen of the image displaying unit in a winking state only in the message-storage mode for halting an operation to notify the user of a message in the event of an incoming signal conveying the message.

By incorporating the microcomputer 100 in a portable radio information terminal 50 equipped with components including a communication mechanism unit, a memory unit 7 for recording a received message, an input device used for entering an input command, a message-notifying unit, an image displaying unit for displaying information such as a message and a power-supply circuit, it is possible to easily provide the portable radio information terminal 50 with a function implemented by the message-notifying-mode/message-storage-mode setting means 31 to switch the portable radio information terminal 50 to the message-storage mode, a function implemented by the message-notifying-device-operation control means 32 to halt the operation of a selected message-notifying device in the message-storage mode and a function implemnted by the display-mark winking means 36 to put at least one of display marks of the message-notifying devices displayed on the screen of the image displaying unit in a winking state only in the message-storage mode.

What is claimed is:

1. A portable radio information terminal comprising:

a receiver for receiving an incoming information signal conveying information and extracting said information from said incoming information signal;

a plurality of message-notifying devices including at least a ringing-sound-message-notifying device and vibration-message-notifying device for generating a ringing sound and a vibration respectively in an event of said incoming information signal to notify a user of said incoming information signal;

a message-notifying-device selecting means for selecting one of said message-notifying devices and for enabling said message-notifying device selected by the message-notifying device selecting means to operate to notify the user of said incoming information signal;

an image displaying unit for displaying said information conveyed by said incoming information signal and a display mark indicating an operative state of at least said message-notifying device selected by said message-notifying-device selecting means; and a control unit for controlling at least an operation to display said information on said image displaying unit;

message-notification mode/message-storage mode setting means for use by the user with a high degree of freedom to set said portable radio information terminal in a message-notification mode for notifying the user of a message in the event of said incoming information signal conveying said message or in a message-storage mode for halting the operation to notify the user of the message in the event of the incoming information signal conveying said message;

message-notifying-device-operation control means for setting said message-notifying device selected by said message-notifying-device selecting means in a state of notifying the user of said incoming information signal in said message-notification mode or preventing said message-notifying device selected by said message-notifying-device selecting means from notifying the user of the incoming information signal in said message-storage mode; and display-mark turning on/off means for displaying the display mark of said message-notifying device selected by said message-notifying-device selecting means on a screen of said image displaying unit in said message-notification mode or halting the operation to display display marks of all of said message-notifying devices including said message-notifying device selected by said message-notifying-device selecting means to indicate that the portable radio information terminal is in said message-storage mode.

2. A recording medium for storing at least three procedures for execution by a computer employed in a portable radio information terminal having an image displaying means and a plurality of message-notifying devices including at least a ringing-sound-message-notifying device and a vibration-message-notifying device for generating a ringing sound and a vibration respectively in an event of an incoming information signal to notify a user of said incoming information signal, comprising:

message-notification mode/message-storage mode setting means for use by the user with a high degree of freedom to set said portable radio information terminal in a message-notification mode for notifying the user of a message in the event of the incoming information signal conveying said message or in a message-storage mode for halting an operation to notify the user of said message in the event of said incoming information signal conveying said message;

message-notification-device-operation control means for setting a message-notifying device selected from said message-notifying devices for notifying the user of the incoming information signal in said message-notification mode or preventing said message-notifying device selected from said message-notifying devices from notifying the user of the incoming information signal in said message-storage mode; and display-mark turning on/off means for displaying a display mark of said message-notifying device selected from said message-notifying devices on a screen of said image displaying means in said message-notification mode or halting an operation to display display marks of all of said message-notifying devices including said message-notifying device selected from said message-notifying devices to indicate that the portable radio information terminal is in said message-storage mode.

3. A microcomputer, comprising:

an embedded central processing unit;

an embedded storage unit for storing programs for execution by said embedded central processing unit; and an embedded data transfer means connected to external equipment and used for connecting at least said embedded central processing unit to said embedded storage unit, said microcomputer further provided with means to transmit a signal based on a processing result outputted by said embedded central processing unit to said external equipment by one of radio communication and wire communication and employed in a portable radio information terminal comprising an image displaying unit and a plurality of message-notifying devices including at least a ringing-sound-message-notifying device and a vibration-message-notifying device for generating a ringing sound and a vibration respectively in an event of an incoming information signal to notify a user of said incoming information signal, wherein said embedded storage unit includes at least:

message-notification mode/message-storage mode setting means for use by the user with a high degree of freedom to set said portable radio information terminal in a message-notification mode for notifying the user of a message in the event of said incoming information signal conveying said message or in a message-storage mode for halting an operation to notify the user of said message in the event of said incoming information signal conveying said message;

message-notifying-device-operation control means for setting a message-notifying device selected from said message-notifying devices in a state for notifying the user of said incoming information signal in said message-notification mode or preventing said message-notifying device selected from said message-notifying devices from notifying the user of said incoming information signal in said message-storage mode; and display-mark turning on/off means for displaying a display mark of said message-notifying device selected from said message-notifying devices on a screen of said image displaying unit in said message-notification mode or halting an operation to display marks of all of said message-notifying devices including said message-notifying device selected from said message-notifying devices to indicate that the portable radio information terminal is in said message-storage mode.

4. A screen displaying method adopted in a portable radio information terminal including a radio-wave receiving means, a message-notifying means comprising a plurality of message notifying devices including at least a ringing-sound-message-notifying device and a vibration-message-notifying device for generating a ringing sound and a vibration respectively in an event of an incoming information signal to notify a user of said incoming information signal and an image displaying unit wherein one of said message-notifying devices of said message-notifying means specified in advance operates to notify the user of an arrival of said incoming information signal at said radio-wave receiving means, said method comprising the steps of:

displaying a display mark of at least one of said message-notifying devices of said message-notifying means specified in advance on a screen of said image displaying unit when said portable radio information terminal has been set in a message-notification mode for notifying the user of a message in the event of said incoming information signal conveying said message; and putting display marks of at least one of said message-notifying devices of said message-notifying means including one of said message-notifying devices, specified in advance in a winking state on said screen of said image displaying unit to indicate that said portable radio information terminal has been set in a message-storage mode for suppressing an operation to notify the user of said message in the event of said incoming information signal conveying said message.

5. A portable radio information terminal comprising:

a receiver for receiving an incoming information signal conveying information and extracting said information from said incoming information signal;

a plurality of message-notifying devices including at least a ringing-sound-message-notifying device and a vibration-message-notifying device for generating a ringing sound and a vibration respectively in an event of said incoming information signal to notify a user of said incoming information signal;

a message-notifying-device selecting means for selecting one of said message-notifying devices and enabling said message-notifying device selected by said message-notifying-device selecting means to operate to notify the user of an arrival of said incoming information signal;

an image displaying unit for displaying said information conveyed by said incoming information signal and a display mark indicating an operative state of at least said message-notifying device selected by said message-notifying device selecting means; and a control unit for controlling at least an operation to display said information on said image displaying unit:

message-notification mode/message-storage mode setting means for use by the user with a high degree of freedom to set said portable radio information terminal in a message-notification mode for notifying the user of a message in the event of said incoming information signal conveying said message or in a message-storage mode for halting the operation to notify the user of a message in the event of said incoming information signal conveying said message;

message-notifying-device-operation control means for setting said message-notifying device selected by said message-notifying-device selecting means in a state for notifying the user of said incoming information signal in said message-notification mode or preventing said message-notifying device selected by said message-notifying-device selecting means from notifying the user of said incoming information signal in said message-storage mode;

display-mark turning-on means for turning on the display mark of said message-notifying device selected by said message-notifying-device selecting means displayed on a screen of said image displaying unit in said message-notification mode; and display-mark winking means for putting display marks of all of said message-notifying devices including said message-notifying device selected by said message-notifying-device selecting means displayed on said screen of said image displaying unit in a winking state to indicate that the portable radio information terminal is in said message-storage mode.

6. A recording medium for storing at lest four procedures for execution by a computer employed in a portable radio information terminal having an image displaying means and a plurality of message-notifying devices including at least a ringing-sound-message-notifying device and a vibration-message-notifying device for generating a ringing sound and a vibration respectively in an event of an incoming information signal to notify a user of said incoming information signal, said four means including:

a message-notification mode/message-storage mode setting means for use by the user with a high degree of freedom to set said portable radio information terminal in a message-notification mode for notifying the user of a message in the event of said incoming information signal conveying said message or in a message-storage mode for halting an operation to notify the user of said message in the event of said incoming information signal conveying said message;

message-notifying-device-operation control means for setting a message-notifying device selected from said message-notifying devices in a state for notifying the user of the incoming information signal in said message-notification mode or preventing said message-notifying device selected from said message-notifying devices from notifying the user of the incoming information signal in said message-storage mode;

display-mark turning-on means for turning on a display mark of said message-notifying device selected from said message-notifying devices displayed on a screen of said image displaying unit in said message-notification mode; and display-mark winking means for putting display marks of all of said message-notifying devices including said message-notifying device selected from said message-notifying devices displayed on said screen of said image displaying unit in a winking state to indicate that the portable radio information terminal is in said message-storage mode.

7. A microcomputer, comprising:

an embedded central processing unit;

an embedded storage unit for storing programs for execution by said embedded central processing unit; and embedded data transfer means connected to external equipment and used for connecting at least said embedded central processing unit to said storage unit, said microcomputer further provided with a function to transmit a signal based on a processing result outputted by said central processing unit to said external equipment by one of radio communication and wire communication and employed in a portable radio information terminal also comprising an image displaying unit and a plurality of message-notifying devices including at least a ringing-sound-message-notifying device and a vibration-message-notifying device for generating a ringing sound and a vibration respectively in an event of an incoming information signal to notify a user of said incoming information signal, wherein said programs stored in said embedded storage unit include at least:

message-notification mode/message-storage mode setting means for use by the user with a high degree of freedom to set said portable radio information terminal in a message-notification mode for notifying the user of a message in the event of said incoming information signal conveying said message or in a message-storage mode for halting an operation to notify the user of said message in the event of said incoming information signal conveying said message;

message-notifying-device-operation control means for setting a message-notifying device selected from said message-notifying devices in a state for notifying the user of said incoming information signal in said message-notification mode or preventing said message-notifying device selected from said message-notifying devices from notifying the user of said incoming information signal in said message-storage mode;

a display-mark turning-on means for turning on a display mark of said message-notifying device selected from said message-notifying devices displayed on a screen of said image displaying unit in said message-notification mode; and a display-mark winking means for putting display marks of all of said message-notifying devices including said message-notifying device selected from said message-notifying devices displayed on said screen of said image displaying unit in a winking state to indicate that the portable radio information terminal is in said message-storage mode.

* * * * *